United States Patent [19]

Sogabe

[11] Patent Number: 5,491,599
[45] Date of Patent: Feb. 13, 1996

[54] MAGNETIC DISK APPARATUS

[75] Inventor: Chikayuki Sogabe, Odawara, Japan

[73] Assignee: Hitachi, Ltd., Tokyo, Japan

[21] Appl. No.: 265,300

[22] Filed: Jun. 24, 1994

[30] Foreign Application Priority Data

Jun. 30, 1993 [JP] Japan .................................. 5-161204

[51] Int. Cl.$^6$ ................................................ G11B 21/02
[52] U.S. Cl. ............................................ 360/106; 360/104
[58] Field of Search ................................ 360/106–107, 360/104–105, 98.08, 99.12

[56] References Cited

U.S. PATENT DOCUMENTS

| | | | |
|---|---|---|---|
| 4,945,432 | 7/1990 | Matsudaira et al. | 360/98.08 X |
| 4,991,045 | 2/1991 | Oberg | 360/104 |
| 4,994,931 | 2/1991 | Foot | 360/106 |
| 5,026,018 | 10/1991 | Yaeger | 360/104 |
| 5,031,061 | 7/1991 | Hatch | 360/98.07 |
| 5,089,922 | 2/1992 | Le Clair | 360/98.08 X |
| 5,317,225 | 5/1994 | Miyaji et al. | 360/98.08 X |
| 5,319,512 | 6/1994 | Garpenthin | 360/106 |

FOREIGN PATENT DOCUMENTS

235671  2/1990  Japan .

*Primary Examiner*—John H. Wolff
*Attorney, Agent, or Firm*—Kenyon & Kenyon

[57] ABSTRACT

A magnetic disk apparatus has a plurality of spacers for connecting to a pivot shaft one ends of suspension arms for supporting sliders such that the suspension arms are separated from each other. Each spacer has a first section engaged with the pivot shaft, a second section connected to a suspension arm and a through-hole extending through the two sections. The first section of the spacer is deformed to frictionally grip the pivot shaft. The spacer is provided with a weakened section for preventing the deformation of the first section from being propagated to the second section.

7 Claims, 6 Drawing Sheets

MAGNETIC DISK APPARATUS

BACKGROUND OF THE INVENTION

1. Field of the Invention

This invention relates to a magnetic disk apparatus and, more specifically, to a magnetic disk apparatus of the type in which head positioning is performed by means of a swing arm and which has an improved joint structure for connecting a head assembly to a head positioning mechanism.

2. Description of the Related Art

In a magnetic disk apparatus of the type in which the head positioning is effected by means of a swing arm assembly, the moment of inertia of the rotating members about the axis of rotation of the swing arm assembly can be reduced to assure that the assembly can be quickly accelerated and decelerated and the head can be reliably set to a desired position on the surface of a rotating disk. This leads to a reduction in power consumption, thereby making it possible to realize an energy-saving magnetic disk apparatus.

Generally speaking, one end of a suspension arm of a head assembly supports a slider, and the other end thereof is fastened to a spacer. The spacer is connected to an arm member which is fastened to a pivot shaft by adhesive, caulking or screws. The head assembly, the arm member and the pivot shaft form a swing arm assembly. The positioning of the head is effected by rotating this swing arm assembly by a voice coil motor.

Japanese Unexamined Patent Publication No. 2-35671 discloses a magnetic disk apparatus in which a hole is formed in the suspension arm of each head assembly and spacers and suspension arms are alternately fitted onto a shaft, the outermost suspension arms are pressed by retainers so that the suspension arms are directly joined to the shaft, thereby reducing the moment of inertia of the swing arm assembly.

Although the above-described prior-art structure can reduce the moment of inertia, it is incapable of attaining an improvement in the floating characteristics of the head, which are most important in reading and writing information. For a head to be able to levitate over the disk in a stable manner, it is necessary for the suspension arm to hold the head slider with a load of several grams. Regarding this load, only a deviation of approximately 10% from a design value is permitted. The load to be applied to the slider of the head is finely adjusted by deforming the suspension arm before the head assembly is attached to the shaft. However, when spacers are fastened to the suspension arm or when, as in the above-mentioned Japanese Unexamined Patent Publication No. 2-35671, suspension arms are held between spacers and pressurized from above and below, the condition or degree of deformation effected on the suspension arms for the purpose of fine adjustment is changed, so that the suspension arm cannot generate the predetermined loads. As a result, the designed spacing between head and disk cannot be obtained. In addition, the angle at which a slider is mounted is adversely affected with a resultant unstable floating of the head. These facts constitute an obstacle to correct writing and reading of information.

SUMMARY OF THE INVENTION

The present invention provides a predetermined head spacing in a magnetic disk apparatus of the type in which suspension arms are rotated by a pivot shaft.

In accordance with the present invention, there is provided a magnetic apparatus including: a plurality of magnetic disks arranged parallel to each other; means for supporting and rotating said magnetic disks; sliders arranged close to the surfaces of said magnetic disks; suspension arms each supporting one of said sliders at one end thereof in such a way as to keep the spacing of the slider from the surface of an associated magnetic disk substantially constant; a pivot shaft for rotating said suspension arms; and a plurality of spacers respectively connecting the other ends of said suspension arms to said pivot shaft. Each of the spacers includes a first section which is engaged with the pivot shaft, a second section which is connected to the suspension arm, and a through-hole extending through these two sections. The pivot shaft extends through the above-mentioned through-hole, the through-hole including first and second hole sections. The first hole section is disposed in the first section of the spacer. The second hole section is disposed in the second section of the spacer, communicates with the first hole section and has a diameter larger than the outer diameter of the pivot shaft. The first section of each spacer is deformed to frictionally grip the pivot shaft. Each spacer is provided with means for preventing the deformation of the first section from being propagated to the second section.

According to a first embodiment of the magnetic disk apparatus, each of the spacers has a third section disposed between the first and second sections. The through-hole has a third hole section formed in the third section and having a diameter larger than the outer diameter of the pivot shaft. The pivot shaft extends also through the third hole section. The second section of the spacer protrudes radially outwards from the third section with respect to the axis of the through-hole. The third section has a radial wall thickness which is smaller than the radial wall thickness of each of the first and second sections, whereby the third section of the spacer is weakened in terms of mechanical strength as compared with the first section, thereby preventing the above-mentioned deformation from being propagated.

In accordance with a second embodiment of the present invention, a plurality of slits substantially parallel to the axis of the through-hole are formed in the first section of the spacer to divide the peripheral wall of the first section into a plurality of tongue-shaped sections, whereby the mechanical strength of the peripheral wall of the first section of the spacer is lowered as compared with that of each of the third and second sections. Further, the plurality of tongue-shaped sections are elastically deformed to resiliently grip the pivot shaft. The deformation of these tongue-shaped sections is not propagated to the third or second sections.

At the stage when the spacer has not been attached to the pivot shaft yet, the diameter of the first hole section is smaller than the outer diameter of the pivot shaft. The pivot shaft is forced into the first hole section of the pivot shaft, and, in this process, the first section of the spacer undergoes elastic deformation which is directed radially outwards to grip the pivot shaft resiliently and frictionally. However, since the spacer is provided with means for preventing propagation of deformation, the deformation of the first section of the spacer is not propagated to the second section thereof. Therefore, the load of the suspension arm on the slider, which is set prior to the attachment of the suspension arm to the spacer, does not undergo any change when the suspension arm is mounted on the pivot shaft. That is, after its attachment to the pivot shaft, the suspension arm applies a substantially predetermined load (i.e., a load which is in conformity with the designed value) to the head.

A plurality of such spacers are mounted on the pivot shaft one upon another and axially pressed and clamped together.

However, in the first embodiment, the axial clamping force is absorbed by the deformation of the third section of each spacer and, in the second embodiment, by the deformation of the tongue-shaped sections of the spacer. Thus, it is possible to effectively prevent the second section of the spacer, to which the suspension arm is connected, from being deformed by the clamping force.

The above and other objects, features and advantages of the present invention will become more apparent from the following detailed description with reference to the drawings.

DETAILED DESCRIPTION

Figure 1:
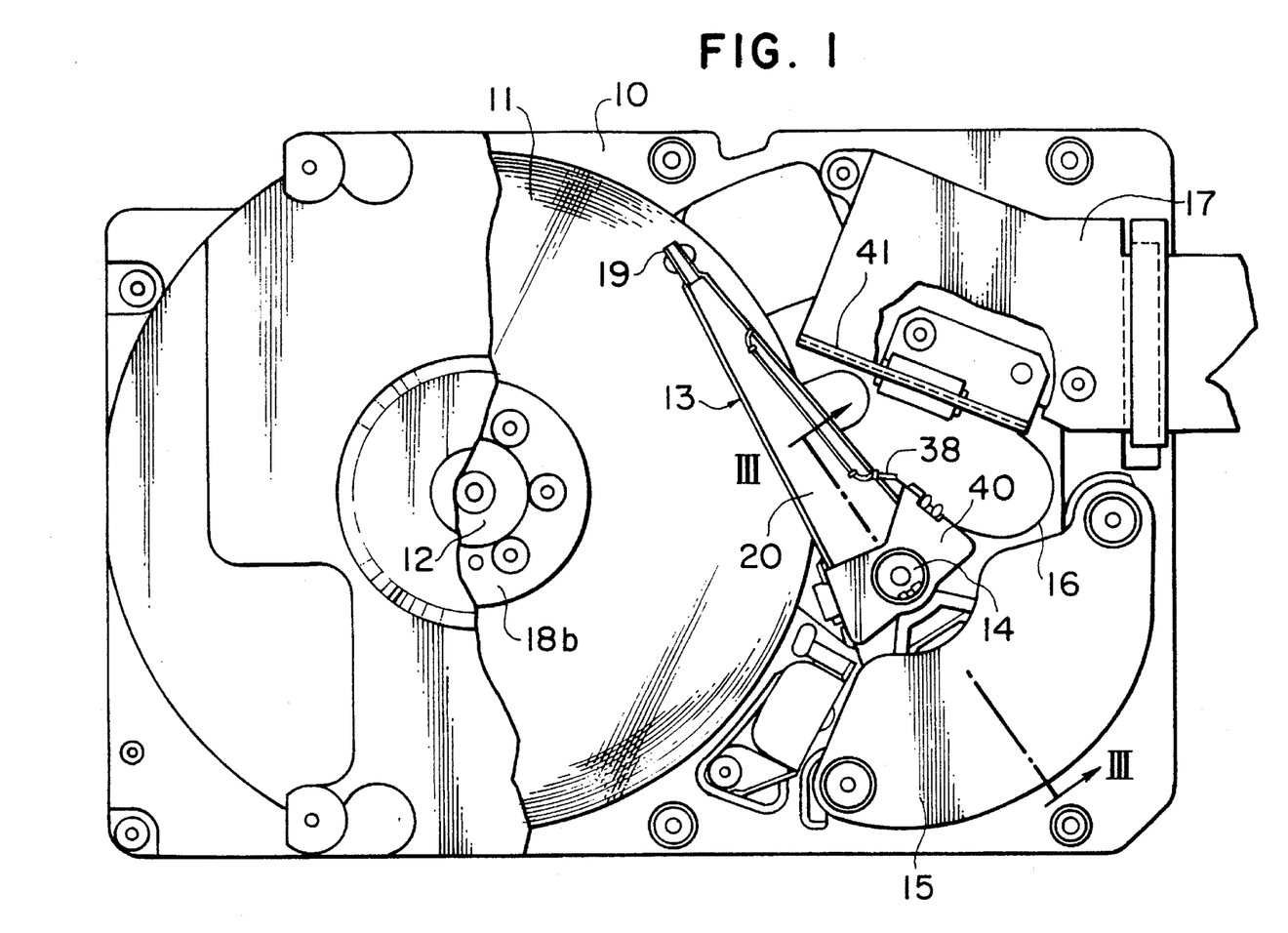
FIG. 1 is a partially cut-away plan view of a magnetic disk apparatus according to an embodiment of the present invention.
Figure 2:
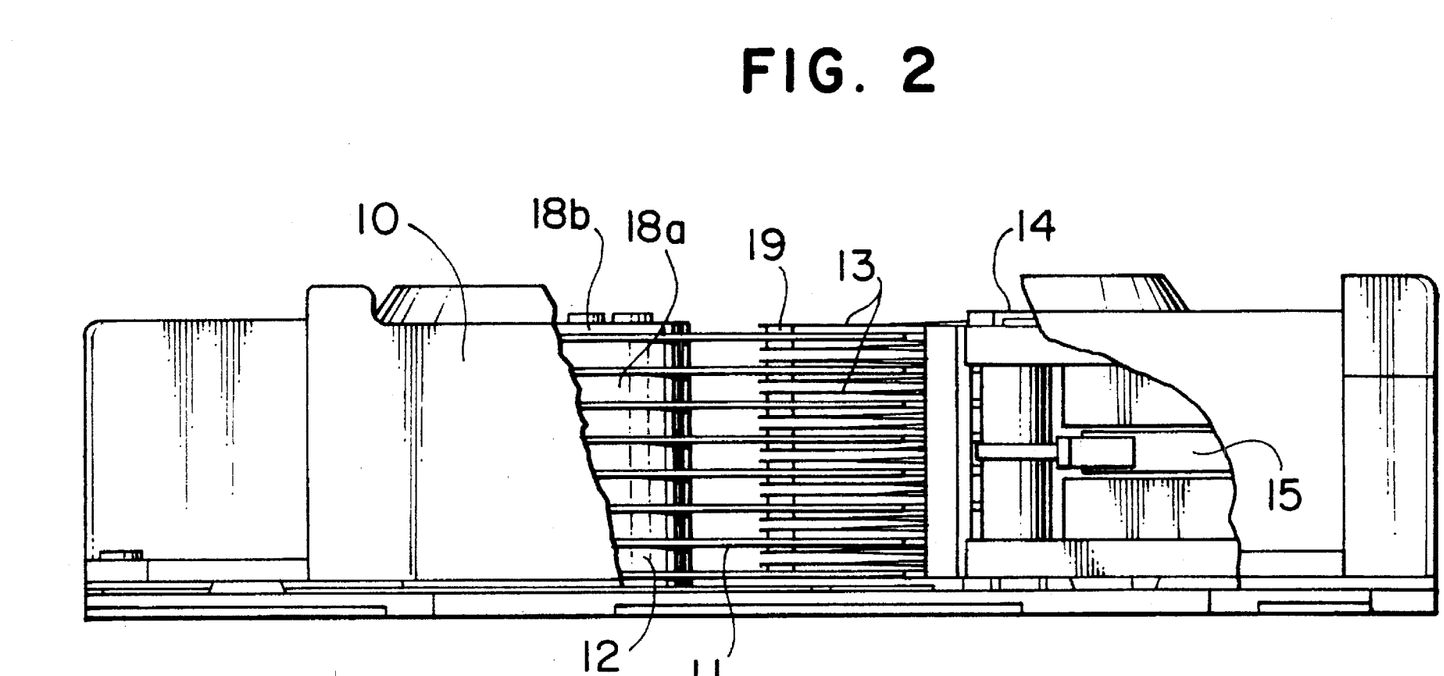
FIG. 2 is a partially cut-away side view of the magnetic disk apparatus shown in FIG. 1.

An embodiment of the disk storage apparatus of the present invention will now be described with reference to FIGS. 1 through 9. As shown in FIGS. 1 and 2, this magnetic disk apparatus includes a closed housing 10; a plurality of disks 11 serving as the magnetic storage medium; a spindle motor 12 for supporting and rotating the disks 11; a plurality of head assemblies 13 each having a slider 19 equipped with a transducer for reading information out of a disk 11 and a suspension arm 20; a swing arm assembly including the head assemblies 13 and a pivot shaft 14 for supporting the head assemblies 13 and rotating them over the disks; a voice coil motor 15 for driving the swing arm assembly; and a printed circuit board 16 electrically connected to a circuit for causing the transducers to write or read information on or from the disks 11 and to a controller (not shown) for controlling the operation of the spindle motor 12 and the voice coil motor 15. The disks 11, the spindle motor 12, the plurality of head assemblies 13, a part of the printed circuit board 16 and the voice coil motor 15 are arranged inside the housing 10 and hermetically enclosed therein.

The spindle motor 12 is of an in-hub type and installed on a base of the housing. The number of disks 11 is, for example, seven. The disks 11 and disk spacers 18a are alternately mounted on the hub of the spindle motor 12 and are fastened to the spindle motor 12 by a disk clamp 18b.

Figures 4, 5:
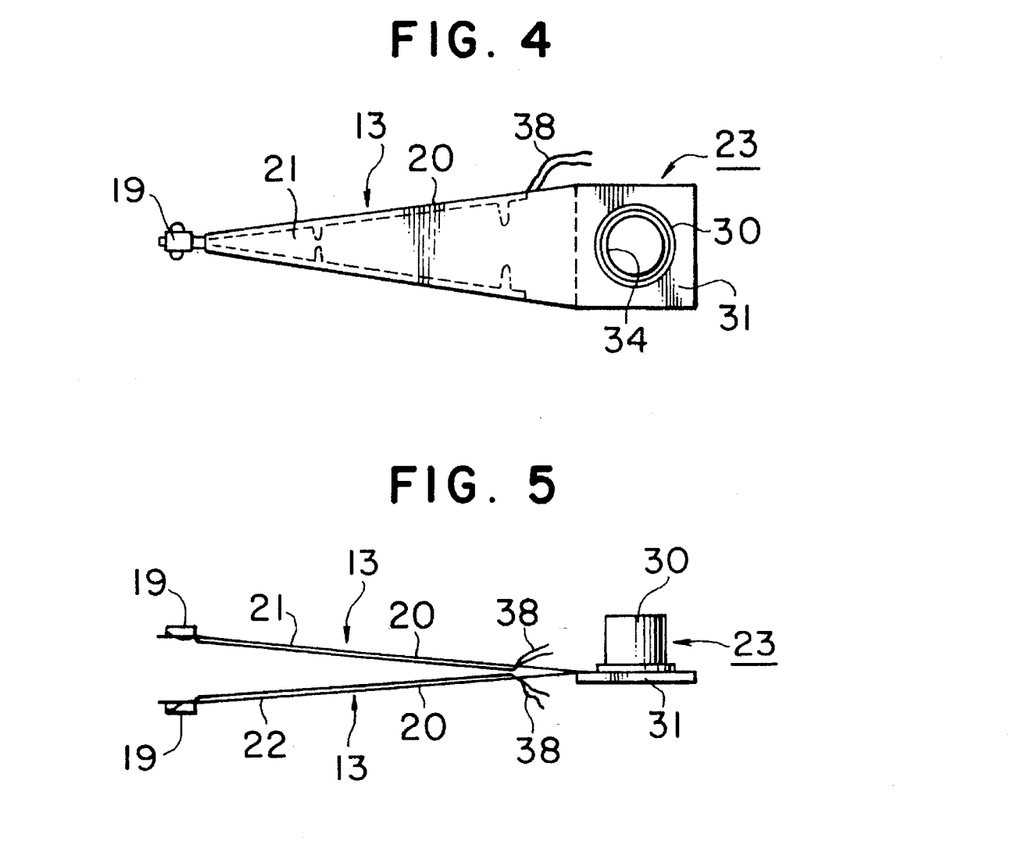
FIG. 4 is a plan view of a set of head assembly and a spacer.
FIG. 5 is a side view of the head assembly and the spacer shown in FIG. 4.

Seven sets of head assemblies 13 are provided, each of which is composed of: sliders 19 each of which is equipped with a transducer; suspension arms 20; a spacer 23 for mounting the suspension arms 20 on the pivot shaft 14, etc. Each transducer consists of a thin-film head, a MIG head or an MR (magnet resistive) dual-type head in which a thin-film head for writing is united with a magnetic resistance effect element for reading, and is secured to an associated slider 19. As shown in FIGS. 4 and 5, each suspension arm 20 has two V-shaped end sections 21 and 22 which are adjusted so as to define therebetween an angle corresponding to the space between two adjacent disks 11. Each slider 19 is secured to one of the front end sections 21 and 22 of the suspension arm 20 via a gimbal, not shown. The seven sets of head assemblies 13 are arranged such that each slider 19 is positioned over one surface of an associated disk 11. Those portions of the front end sections of two suspension arms 20 which are at the ends opposite to the ends where the sliders 19 are mounted are united into one and secured to a spacer 23 which is fitted onto the pivot shaft 14.

Figure 3:
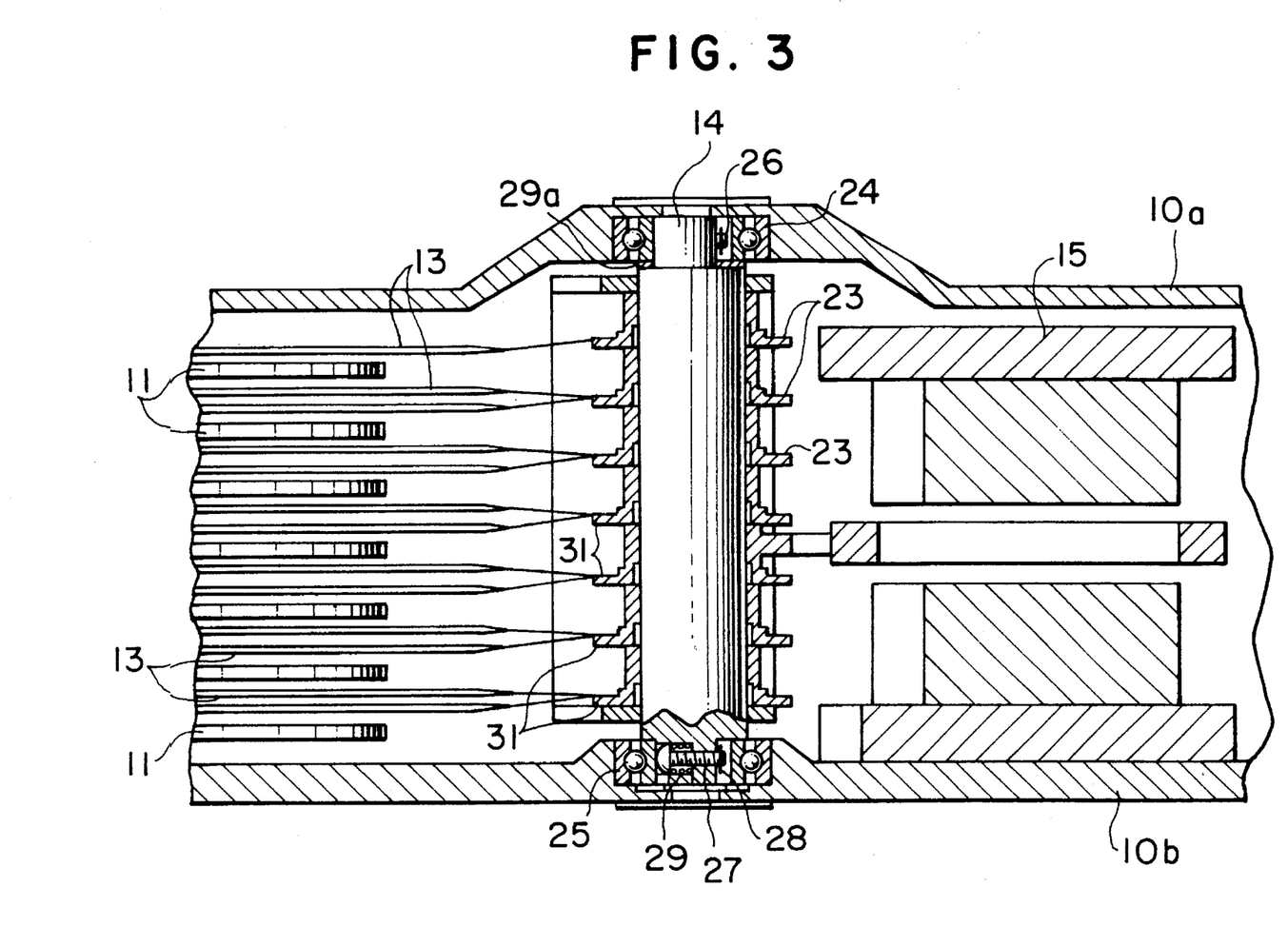
FIG. 3 is an enlarged sectional view taken along line III—III in FIG. 1.

FIG. 3 shows the structure of that section of the magnetic disk apparatus which is around the pivot shaft 14. The pivot shaft 14 is arranged so as to extend between a cover member 10a and a base member 10b, which form a part of the housing 10. Further, the end sections of the pivot shaft 14 are rotatably supported by bearings 24 and 25 provided in the housing members 10a and 10b, respectively. Pins 26 and 27 are respectively incorporated in the upper and lower end sections of the pivot shaft 14 in such a way as to extend radially thereof. The pin 27 extends through the lower end section of the pivot shaft 14 and is prevented by a retaining ring 28 from being detached therefrom. A coil spring 29 is interposed between the head of the pin 27 and the shaft 14 so as to constantly bias the head of the pin 27 to protrude from the shaft 14, thereby eliminating a radial gap between the pivot shaft 14 and the inner race of the bearing 25. The retaining ring 28 is formed by an E-shaped member to facilitate easy assembly and disassembly of the shaft 14 and the pin 27. The pin 26 is incorporated in the upper end section of the shaft 14 to eliminate a radial gap between the pivot shaft 14 and the inner race of the bearing 24. Further, a leaf spring member 29a is provided between a shoulder on the upper end section of the pivot shaft 14 and the bearing 24 to eliminate any axial play of the pivot shaft 14.

Figure 6:
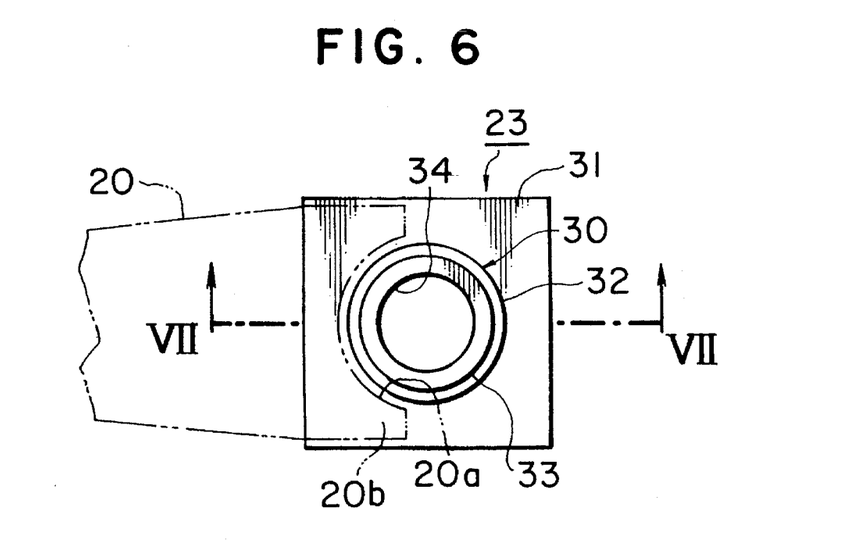
FIG. 6 is an enlarged plan view of the spacer shown in FIGS. 4 and 5.
Figure 7:
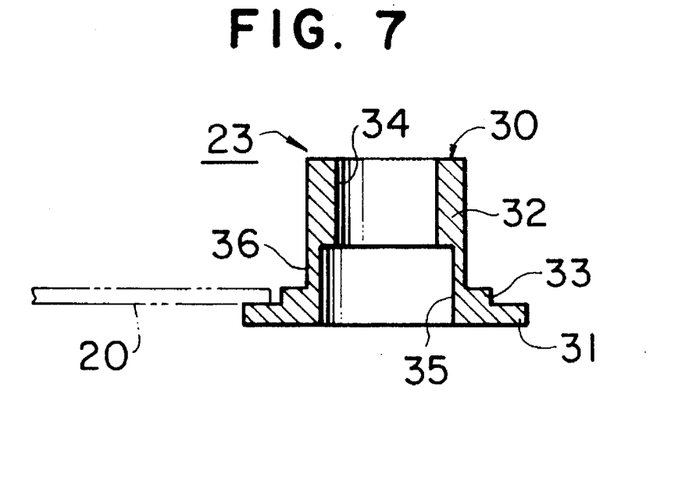
FIG. 7 is a sectional view taken along line VII—VII in FIG. 6.

As shown in FIGS. 6 and 7, each spacer 23 includes a cylindrical member 30 and a flange section 31 integrally formed at one end thereof and has a height corresponding to the distance between two adjacent disks 11. The cylindrical member 30 has two cylindrical sections 32 and 33 having different diameters, the cylindrical section 33 having the larger diameter and disposed adjacent the flange section 31. The diameter of the cylindrical section 33 is slightly smaller than that of an arcuate recess or notch 20a of the suspension arm 20 which is to be fitted onto the spacer 23, while the height (thickness) of the cylindrical section 33 is slightly larger than the thickness of the suspension arm 20. The through-hole in the spacer 23 also consists of two hole sections 34 and 35 having different diameters. At the stage when the spacer 23 has not been mounted on the pivot shaft 14 yet, the hole section 34 has a diameter which is slightly smaller than the diameter of the pivot shaft 14 while the hole section 35 has a diameter which is larger than that of the hole section 34. The inner (upper) end of the hole section 35 is situated above the upper surface of the cylindrical section 33, so that that section of the cylinder section 32 which is adjacent the cylindrical section 33 is formed as a thin-walled section 36.

As shown in FIG. 3, a plurality of spacers 23 are fitted onto the pivot shaft 14 in such a way as to be laid one upon another. Each spacer 23 is fastened to the pivot shaft 14 by forcing the pivot shaft 14 into the cylindrical section 32. As shown in FIGS. 6 and 7, the arcuate recess 20*a* which is formed in the end of the suspension arm 20 opposite to the end where the slider 19 is disposed, is fitted onto the outer periphery of the spacer 23, and a section 20*b* of the suspension arm 20 which surrounds the recess 20*a* is secured to the flange section 31 of the spacer 23 by adhesion or spot welding, whereby the head assembly 13 is attached to the spacer 23.

The printed circuit board 16 consists of a flexible printed circuit board one end of which is connected to a member 40 that is fastened to the pivot shaft 14, as shown in FIG. 1. The central section of the printed circuit board 16 is bent into a U-shape so as to follow rotary motion of the pivot shaft 14 and is fastened to a support plate 41 which is disposed in the housing 10. The other end of the printed circuit board 16 extends to the exterior of the housing 10 so as to be connected to an external circuit board (not shown) having a controller. A lead 38 from the head extends along a side edge of the suspension am 20 and is connected to that end of the printed circuit board 16 adjacent the pivot shaft 14.

The swing am assembly is swung by the voice coil motor 15. The spindle motor 12 rotates the disks 11 and the voice coil motor 15 rotates the pivot shaft 14 and the swing arm assembly to cause the sliders 19, equipped with transducers, to swing over the disks 11, thereby positioning a selected transducer.

In this magnetic disk apparatus, the rotation of the disks 11 effected by the spindle motor 12 causes the slider 19 of each head assembly 13 to float above the associated disk 11 due to the air flow generated by the rotation of the disk 11 while the suspension am 20 elastically biases the slider 19 toward the disk 11, whereby the slider 19 floats above the disk 11 with a constant spacing. Positional information previously written into one of the disks 11 is read by the transducer carried by one of the sliders 19 and electric current is supplied, in accordance with instructions by the controller, to a coil 39 in the voice coil motor 15, whereby the coil 39 causes the pivot shaft 14, which is rotatably supported by the bearings 24 and 25, to rotate, thereby swinging the head assemblies 13 and moving the sliders 19 so as to perform positioning of the transducers. When information is read, a transducer transduces a magnetic signal recorded on the disk 11 into an electric signal which is transmitted through the lead 38 and the printed circuit board 16 to the controller outside the magnetic disk apparatus. When information is written, an electric signal supplied from the controller is transmitted through the printed circuit board 16 and the lead 38 to a transducer which transducers this signal into a magnetic signal which is recorded on the disk 11.

When information is written or read in the manner as described above, the positioning of the head can be effected quickly and reliably due to the small mass and small moment of inertia of the structure of the swing arm assembly which is composed of the head assemblies 13, the arms 37, the coil 39 and the pivot shaft 14. Further, the connection between the pivot shaft 14 and each spacer 23 is achieved by the elastic deformation of only the cylindrical section 32 of the spacer 23, and the radially outwardly directed force generated at the time of connection therebetween enlarges the cylindrical section 32 of the spacer and deforms the thin-walled section 36 thereof. That is, this force is absorbed by the thin-walled section 36 and is applied neither to the flange section 31 nor to the suspension arm 20 supported thereby, so that the design load of the suspension arm 20, predetermined with respect to the sliders, does not change at the time of mounting of the suspension arm 20. In addition, the axial force generated between each adjacent pair of spacers 23 when a plurality of spacers are mounted on the pivot shaft 14 in stacked relationship and pressed axially of the shaft 14 can be absorbed by deformation of the thin-walled section 36 of each of the spacers 23. Thus, the axial force is not applied to the flange sections of the spacers 23 and to the suspension arms 20 supported thereby. Accordingly, the design value of the load of each suspension arm 20 to an associated slider is not changed when the suspension arms 20 are connected to the pivot shaft 14. It is also possible to keep constant the spacing of respective head assemblies 13. Thus, due to the construction in which the suspension arm 20 has two front end sections 21 and 22 respectively supporting a pair of sliders 19, that is, due to the construction in which the suspension arm 20 having a plurality of transducers is attached to a single spacer 23, the number of spacers can be reduced, so that the number of parts of the magnetic disk apparatus is made smaller as compared with that of conventional apparatus, thereby making it possible to realize a disk storage apparatus which can be easily assembled and which has a small thickness.

Further, in the disk storage apparatus of the present invention, the moment of inertia of the head positioning mechanism about the pivot shaft 14 is reduced to enable each head to be positioned accurately and quickly. In addition, it is also possible to prevent a reduction of accuracy in head positioning due to the heat generated by the coil in the voice coil motor 15.

Figure 8:
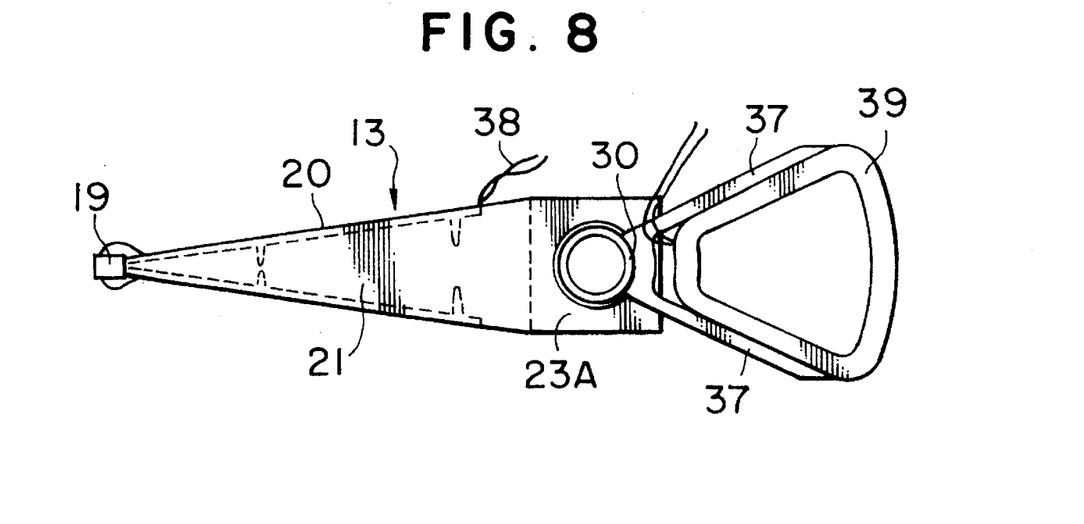
FIG. 8 is a plan view of another set of head assembly and spacer.
Figure 9:
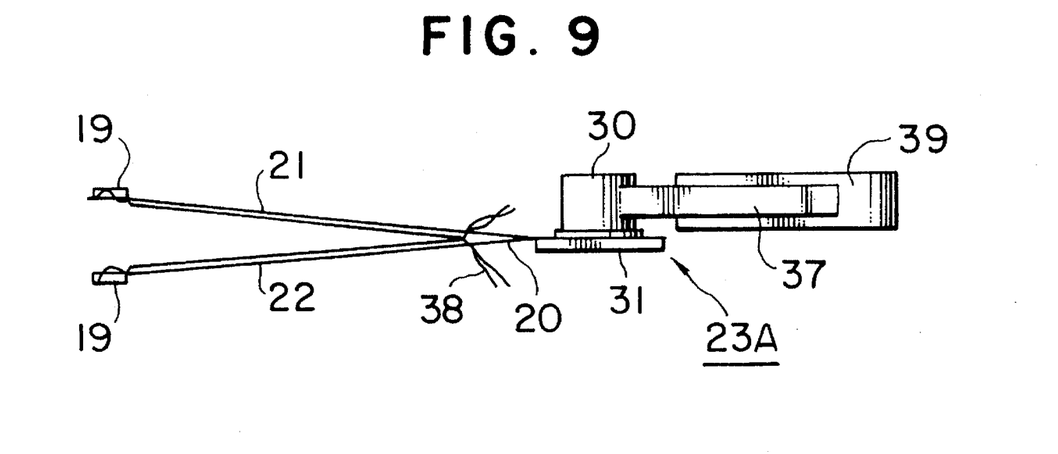
FIG. 9 is a side view of the head assembly and the spacer shown in FIG. 8.

This point will be explained in more detail with reference to FIGS. 8 and 9 which show a spacer 23A arranged between other spacers. The spacer 23A includes V-shaped arms 37 formed integrally with the cylindrical section 30 and extending toward the interior of the voice coil motor 15, that is, in the direction opposite to the suspension arm 20. The coil 39 of the voice coil motor 15 is positioned between the V-shaped arms 37 and is connected thereto. This coil support structure of the voice coil motor 15 is advantageous in that the coil 39 of the voice coil motor 15 is spaced apart from the suspension arms 20, so that, during head positioning, the suspension arms 20 are substantially free from the influence of the heat generated by the coil 39, that is, the suspension arms 20 do not suffer from deformation due to this heat, whereby it is always possible for the suspension arms 20 to generate predetermined loads to enable the sliders 19 to float in a more stable manner, thereby making it possible for the transducers to perform writing and reading in high density and with a high level of reliability. Further, in this magnetic disk apparatus, the suspension arms 20, the spacers 23 and the pivot shaft 14 of the head assembly are made of materials having substantially the same coefficients of thermal expansion, so that the floating of the sliders 19 is further stabilized, thereby enabling the transducers to perform writing and reading with still higher density and reliability.

Figure 10:
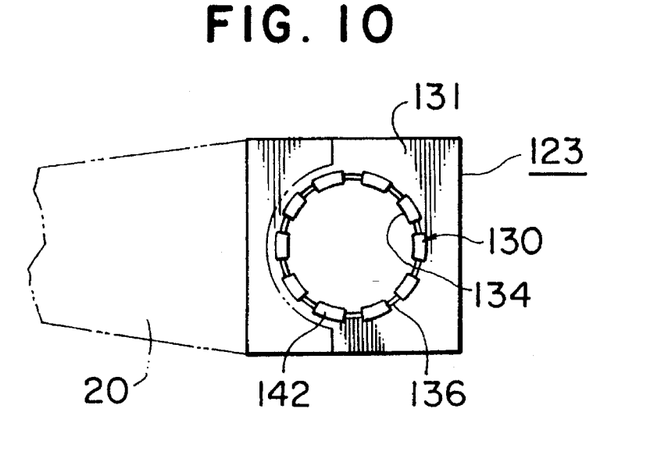
FIG. 10 is an enlarged plan view of a modification of the spacer.
Figure 11:
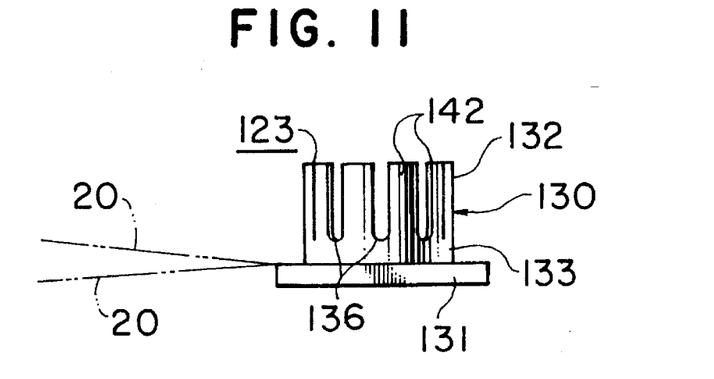
FIG. 11 is a side view of the spacer shown in FIG. 10.

FIGS. 10 and 11 show a modified spacer 123 which also includes a cylindrical section 130 and a flange section 131 that is integrally formed at one end thereof. As in the above embodiment, the height of this spacer corresponds to the distance between two adjacent disks 11. The cylindrical section 130 has an upper end section 132 and a lower end section 133 which is formed integrally therewith and which has the same outer diameter as the upper end section 132. The upper end section 132 has a number of slits 136 extending parallel with the axis of the spacer 123, whereby the peripheral wall of the upper end section 132 is divided into a plurality of tongues 142. The lower end section 133 is disposed between the upper end section 132 and the flange section 131. At the stage when the spacer 123 has not been attached to the pivot shaft 14 yet, the diameter of a hole section 134 defined by the inner surfaces of the tongues 142 is smaller than the diameter of the pivot shaft 14, while the diameter of a hole section (not shown) defined by the inner surfaces of the lower end section 133 and of the flange section 131 is larger than the diameter of the pivot shaft 14. This structure will be well appreciated with reference to the difference in diameter between the hole sections 34 and 35 shown in FIG. 7.

The spacer 123 is mounted on the pivot shaft 14 by forcing the pivot shaft 14 into the through-hole 134 against the resilient forces of the tongues 142. By thus forcing-in the pivot shaft 14, the tongues 142 of the spacer 123 are elastically deformed radially outwardly, so that the pivot shaft 14 is resiliently and frictionally gripped by the tongues. The head assembly 13 is mounted on the spacer 123 by engaging the arcuate cutout 20a in one end of the suspension arm 20 with the lower section 133 of the cylindrical section 130 of the spacer 123 and by connecting the peripheral section 20b around the cutout 20a to the flange section 131.

In this structure, the connection between the spacer 123 and the pivot shaft 14 is attained by the elastic gripping of the pivot shaft 14, which is solely due to the radially outwardly directed elastic deformation of the tongues 142, so that the deformation of the tongues 142 when the pivot shaft 14 is forced into the through-hole 134 of the spacer 123 is not propagated to the flange section 131 of the spacer. Therefore, the flange section 131 undergoes no deformation when the pivot shaft 14 and the spacer 123 are joined to each other. Further, the axial compressive force that is generated when a plurality of spacers 123, laid one upon another, are mounted on the pivot shaft 14 and axially clamped together, is consumed (i.e., absorbed) as the force for deflecting the tongues 142 of the spacer 123. Accordingly, even if this compressive force acts on the spacer 123, the flange section 131 of the spacer undergoes no deformation, so that the attachment of the suspension arm 20 to the flange section 131 does not cause any change in the design load of the suspension arm 20, thereby enabling the spacing of the head to be maintained at the design value and facilitating an easier mounting of the spacers 123 on the pivot shaft 14 as compared with the case of the spacers 23 described with reference to FIGS. 6 and 7.

Each of the spacers 23 and 123 described above is capable of supporting two adjacent head assemblies 13 respectively arranged adjacent both sides of one disk or adjacent the opposite sides of two adjacent disks, whereby the number of parts of the magnetic disk apparatus can be reduced.

Figure 12:
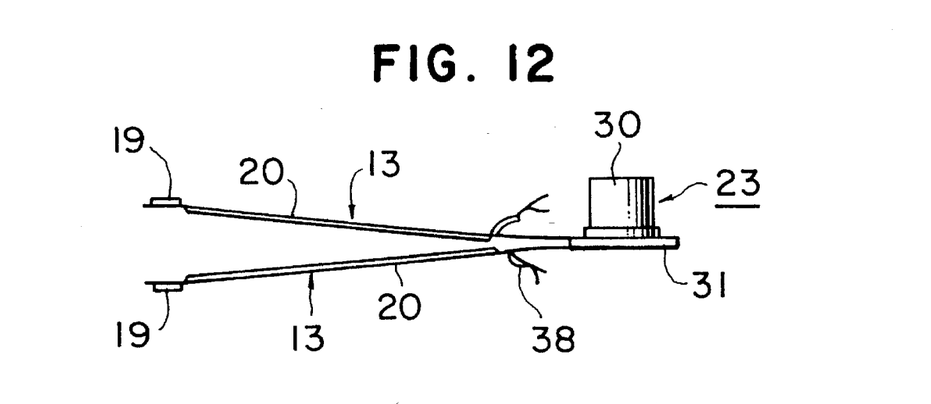
FIG. 12 is a view which is similar to FIG. 5 but which shows a modification of the structure for attaching head assemblies to a spacer.

FIG. 12 shows a modification of the structure for mounting head assemblies 13 on the spacer 23 shown in FIG. 5. In this modification, the spacer 23 is formed in the same way as the spacer described with reference to FIGS. 6 and 7. The suspension arm 20 of the head assembly 13 for one of two adjacent disks is arranged on the upper surface of the flange section 31 (the surface adjacent the cylindrical section 30) of the spacer 23 and fastened thereto, and the suspension arm 20 of the head assembly 13 for the other of the two adjacent disks is arranged on the surface on the opposite side (i.e., the lower surface) of the flange section 31 and is fastened thereto. As in the above-described embodiment, the suspension arms 20 of the two head assemblies 13 are bent so as to exhibit an inner angle corresponding to the disk interval.

As described above, in the disk storage apparatus of the present invention, no load other than the design load is applied to the suspension arm when the head assembly 13 is mounted on the pivot shaft serving as the rotating shaft of the swing arm, so that the fine adjustment of the suspension arm 20, that is, the state of deformation, undergoes no change, thereby making it always possible for the suspension arm to apply the designed floating load to the associated head 19.

What is claimed is:

1. A magnetic disk apparatus comprising:

a plurality of magnetic disks arranged parallel to each other;

means for supporting and rotating said magnetic disks;

sliders arranged close to the surfaces of said magnetic disks; suspension arms each supporting one of said sliders at one end thereof;

a pivot shaft for rotating said suspension arms; and a plurality of spacers respectively connecting the other ends of said suspension arms to said pivot shaft, wherein each of said spacers includes a first section engaged with said pivot shaft, a second section connected to said suspension arm, and a through-hole extending through these two sections, said pivot shaft extending through said through-hole, said through-hole including a first hole section disposed in said first section and a second hole section disposed in said second section, communicating with said first hole section and having a diameter larger than the outer diameter of said pivot shaft, said first section of said spacer being deformed to frictionally grip said pivot shaft, each of said spacers being provided with means for preventing the deformation of said first section from being propagated to said second section.

2. A magnetic disk apparatus according to claim 1, wherein each of said spacers has a third section disposed between said first and second sections, said through-hole having a third hole section formed in said third section and having a diameter larger than the outer diameter of said pivot shaft, said pivot shaft extending also through said third hole section, said second section protruding from said third section radially outwards with respect to the axis of said through-hole.

3. A magnetic disk apparatus according to claim 2, wherein said third section has a mechanical strength lower than that of said first section to constitute said means for preventing propagation of said deformation.

4. A magnetic disk apparatus according to claim 3, wherein said third section has a radial wall thickness smaller than those of said first and second sections.

5. A magnetic disk apparatus according to claim 2, wherein a plurality of slits substantially parallel to the axis of said through-hole are formed in said first section to divide the peripheral wall of said first section into a plurality of tongue-like sections so as to make the mechanical strength of the peripheral wall of said first section lower than those of said third and second sections, said plurality of tongue-like sections being elastically deformed to resiliently grip said pivot shaft.

6. A magnetic disk apparatus according to claim 2, wherein said second section has first and second surfaces extending radially of said pivot shaft, said first surface being adjacent said third section, said second surface forming an end surface of said spacer, the other ends of two adjacent suspension arms being united and connected to said first surface.

7. A magnetic disk apparatus according to claim 2, wherein said second section has first and second surfaces extending radially of said pivot shaft, said first surface being adjacent said third section, said second surface forming an end surface of said spacer, the other ends of two adjacent suspension arms being respectively connected to said first and second surfaces.

\* \* \* \* \*